United States Patent [19]

Hanson

[11] 4,313,868

[45] Feb. 2, 1982

[54] GLASS FILLED POLYAMIDE-IMIDE PHTHALAMIDE COPOLYMER

[75] Inventor: Robert B. Hanson, Oswego, Ill.

[73] Assignee: Standard Oil Company (Indiana), Chicago, Ill.

[21] Appl. No.: 145,334

[22] Filed: Apr. 30, 1980

[51] Int. Cl.³ .................. C08L 77/10; C08G 69/32; C08G 73/14
[52] U.S. Cl. .................. 260/37 N; 528/188; 528/220; 528/229; 528/337; 528/342
[58] Field of Search ............... 528/342, 188, 220, 337, 528/229; 260/37 N

[56] References Cited

U.S. PATENT DOCUMENTS 3,984,375 10/1976 Frost .................... 528/184
4,016,140 4/1977 Morello ................ 528/342

Primary Examiner—Harold D. Anderson
Attorney, Agent, or Firm—Gunar J. Blumberg; William T. McClain; William H. Magidson

[57] ABSTRACT

Novel copolymers and molding compositions are prepared from acyl halide derivatives of dicarboxylic acids, acyl halide derivatives of tricarboxylic aromatic anhydrides and aromatic diamines. Also glass filled copolymers are prepared. The copolymers are useful as engineering plastics.

9 Claims, No Drawings

GLASS FILLED POLYAMIDE-IMIDE PHTHALAMIDE COPOLYMER

BACKGROUND OF THE INVENTION

1. Field of the Invention

The field of this invention relates to glass filled polyamide-imide phthalamide copolymers prepared in an organic solvent and to molding powders and molded articles prepared therefrom. More particularly, the field of this invention relates to glass filled polyamide-imide isophthalamide.

2. Background

Amide-imide polymers are a relatively new class of organic compounds known for their solubility in nitrogen-containing organic solvents when in the largely polyamide form. The major application of the amide-imde polymers has been as wire enamels. This is illustrated in U.S. Pat. Nos. 3,661,832 (1972), 3,494,890 (1970) and 3,347,828 (1967).

Compositions prepared from isophthalic acid and diamines and aliphatic diamines have found application in coatings and films. The prior art on this is summarized in U.S. Pat. No. 3,444,183 (1969).

Reinforced polyhexamethylene isophthalamides have been used to produce articles as disclosed in U.S. Pat. No. 4,118,364 (1978). However, the physical properties of these reinforced polyhexamethylene isophthalamides are insufficient for use in engineering plastics since their tensile strength and the continuous service temperature do not meet those required for engineering plastics.

The general object of this invention is to provide amide-imide and polyamide copolymers. A more specific object of this invention is to provide amide-imide and polyamide copolymers reinforced with glass fibers, glass beads or a mixture thereof. A more specific object of this invention is to provide polyamide-imide and amide polymers prepared from aromatic diamines and mixtures of an acyl halide derivative of an aromatic tricarboxylic acid anhydride and acyl halide derivatives of aromatic dicarboxylic acids wherein said polymers contain from 30 to 60 weight percent glass fibers, glass beads or mixtures of these. Another object is to provide glass-filled polyamide-imide and polyamide copolymers suitable for use as an engineering plastic particularly for use in the manufacture of valve plates. Other objects appear hereinafter.

I have now found that the novel amide-imide amide copolymers can be obtained by reacting acyl halide derivatives of benzene tricarboxylic acid anhydrides and acyl halide derivatives of aromatic dicarboxylic acids with aromatic diamines. I have also discovered that these polymers can be filled from about 30 to 60 weight percent with glass fibers, glass beads or a mixture thereof. Suitably, the aforementioned molding composition may contain from about 30 to 50 weight percent of glass fibers, glass beads or a mixture thereof.

Our studies have shown that fully aromatic amide-imide polymers are very expensive and need special injection molding equipment capable of withstanding injection molding temperatures in the range of 600° to 700° F. at the molding pressure in excess of 20,000 pounds per square inch. Our novel amide-imide amide copolymer and glass filled copolymers are much more economical than conventional polyamide-imide copolymers disclosed in U.S. Pat. Nos. 4,016,140 (1977) and 3,573,260 (1971) and yet retain the same thermal and mechanical properties of the copolymers disclosed in the aforementioned patents. This is a significant advance in the art and is wholly unexpected.

The use of polyamide-imide polymers as engineering plastics has been limited only by their relatively high cost. Thus, when the inherent cost can be brought down, the commercial application of these polymers will be greatly expanded. The copolymers of this invention have large cost advantages over the prior art compositions and thus promise to expand the commercial applications of these polymers.

The copolymers of this invention are prepared by reacting a mixture of an acyl halide derivative of an aromatic tricarboxylic acid anhydride and acyl halide derivatives of aromatic dicarboxylic acids with aromatic diamines.

The novel injection moldable copolymers of this invention comprise recurring polyamide A units of

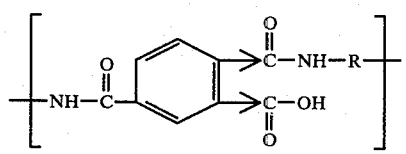

which are capable of undergoing imidization and polyamide B units of

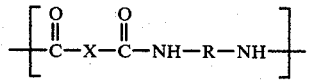

wherein the molar ratio of A units to B units is about 80 to 20 to 20 to 80, preferably 1 to 1 and wherein R is a divalent aromatic hydrocarbon radical of from about 6 to about 20 carbon atoms or two divalent hydrocarbons joined directly or by stable linkages selected from the group consisting of —O—, methylene, —CO—, —SO$_2$—, and wherein X is a divalent aromatic radical and →denotes isomerization.

In the injection molded form the polyamide A units have converted to the polyamide-imide A' units and the copolymer comprises of recurring polyamide-imide A' units of

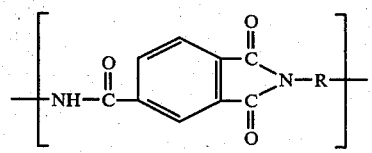

and polyamide B units of

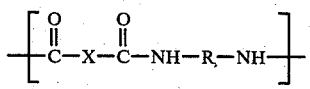

wherein the molar ratio of A' to B units is about 80 to 20 to 20 to 80 preferably 1 to 1 and wherein R and X are defined as above.

The copolymers of this invention are prepared from acyl halide derivatives of dicarboxylic acid such as isophthalic acid or terephthalic acid and an anhydride containing substance and aromatic diamines. Useful acyl halide derivatives of dicarboxylic acid include

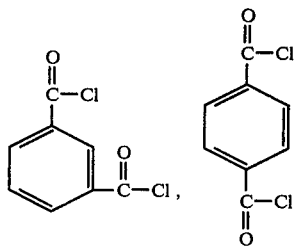

and related compounds. Suitably, the anhydride containing substance is an acyl halide derivative of the acid anhydride having a single benzene or lower acyl substituted benzene ring. The preferred anhydride is four acid chloride is trimellitic anhydride (4 TMAC).

Useful aromatic diamines include para- and meta-phenylenediamine, oxybis (aniline), thiobis (aniline), sulfonylbis (aniline), diaminobenzophenone, methylenebis (aniline), benzidine, 1,5-diaminonaphthalene, oxybis (2-methylaniline), thiobis (2-methylaniline), and the like. Examples of other useful aromatic primary diamines are set out in U.S. Pat. No. 3,494,890 (1970) and U.S. Pat. No. 4,016,140 (1977) both incorporated herein by reference. The preferred diamine is meta-phenylenediamine.

I have found that the polyamide-imide amide copolymers are improved by the addition of reinforcing material particularly the mechanical properties of the copolymers are improved is these copolymers contain from 30 to 60 percent by weight glass fibers, glass beads or a mixture thereof. In the preferred range the copolymers contain 30 to 40 percent by weight of the glass reinforcing material, glass fibers, glass beads or a mixture thereof. Suitable reinforcing materials can be glass fibers, glass beads, glass spheres, glass fabric. The glass fibers are made of alkali-free boron-silicate glass (E-glass) or alkali-containing C-glass. The thickness of the fibers is preferably on average between 3 um and 30 um. It is possible to use both long fibers with an average length of from 5 to 50 mm and also short fibers with an average filament length of from 0.05 to 5 mm. In principle, any standard commercial-grade fibers, especially glass fibers, may be used. Glass beads ranging from 5 um to 50 um in diameter may also be used as reinforcing material.

The reinforced polyamide-imide amide copolymers may be prepared in various ways. For example, so-called rovings, endless glass fiber strands, are coated with the polyamide melt and subsequently granulated. The cut fibers or the glass beads may also be mixed with granulated polyamide and the resulting mixture melted in a conventional extruder, or alternatively the fibers may be directly introduced into the polyamide melt through a suitable inlet in the extruder.

Injection molding of the novel glass filled polymer is accomplished by injecting the copolymer into a mold maintained at a temperature of about 300° to 450° F. In this process a 25 to 28 second cycle is used with a barrel temperature of about 600° to 650° F. The injection molding conditions are given in Table I.

TABLE I

| Mold Temperature | 350 to 450° F. |
| Injection Pressure | 15,000 to 19,000 psi and held for 1 to 3 seconds |

TABLE I-continued

| Back pressure | 100 to 220 psi |
| Cycle Time | 25 to 28 seconds |
| Extruder: | |
| Nozzle Temperature | 600° F. to 630° F. |
| Barrels: | |
| Front heated to | 600° F. to 630° F. |
| Screw: | |
| 20 to 25 revolutions/minute | |

The mechanical properties of the polymers prepared in the Examples are given in Tables 2, 3, and 4 and show that these polymers have excellent mechanical and thermal properties.

In a preferred embodiment 1 mole meta-phenylenediamine is dissolved in a nitrogen containing solvent such as dimethylacetamide or N-methylpyrolidone. A mixture of the 4 acid chloride of trimellitic anhydride and the acid chloride form of isophthalic acid in a molar ratio of 1 to 1 is added to the diamine solution over two hours at about 25°-35° C. The isophthalic anhydride and the 4 acid chloride of trimellitic anhydride may be either dry blended or molten. The viscous solution is then heated at about 50° C. for one hour and the polymer is recovered by precipitation into water. The product is washed thoroughly and dried to a solids content in excess of 96%. The polymer is then dry blended with glass fiber, pelletized and injection molded under molding conditions as set forth in Table I. The mechanical properties of the copolymer are given in Tables 2, 3, and 4.

The following examples illustrate the preferred embodiments of this invention. It will be understood that these examples are for illustrative purposes only and do not purport to be wholly definitive with respect to the conditions or scope of the invention.

EXAMPLE 1

Glass Content 30%

A 10 gal glass-lined Pfaudler kettle equipped with a water-cooled jacket and nitrogen inlet was charged with 9.87 lbs of m-phenylenediamine, 0.35 lbs of trimellitic anhydride and 59.2 lbs of N-methylpyrrolidone. After solution had occurred under a nitrogen purge, an intimate blend of 9.52 lbs of 4-trimellitoyl anhydride chloride and 9.17 lbs of isophthaloyl dichloride was added over 2.5 hrs keeping the temperature below 35° C. The resulting viscous solution was brought to 50° C. When the Gardner viscosity had reached a Z1 viscosity the solution was precipitated by passage through a Fitzpatrick comminuting mill. The polymer product was washed five times with deionized water followed by air-drying on a filter for 3 days. The product was then brought to a solids content of >98% by heating in a forced air oven for 2 hrs at 470° F. The 23.2 lbs of polymer was blended with 10 lbs of PPG 3531 ⅛" glass fiber and 0.34 lbs of PTFE and pellitized on a Columbo RC-9 twin screw extruder. The pilled product was injection molded on a Stokes injection molding machine. The physical properties are shown in Table 2 below.

TABLE 2

| Glass Content, % | | 30 |
|---|---|---|
| Injection Molding Temperature, °F. | | 600 |
| As Molded Properties | ASTM Method | |
| Tensile, psi | D-638 | 13,000 |
| Elongation, % | D-638 | 2.4 |

TABLE 2-continued

| | | |
|---|---|---|
| Tensile Modulus, psi | D-638 | 755,000 |
| HDT, °F. | D-48 | 482 |
| Izod, ft-lbs/in. of notch | D-252 | 1.13 |
| Density g/cm$^3$ | | 1.70 |
| Annealed Properties | ASTM Method | |
| Tensile, psi | D-638 | 22,800 |
| Elongation, % | D-638 | 4.7 |
| HDT, °F. | D-48 | 502 |
| Izod, ft-lbs/in. of notch | D-252 | 1.16 |
| Tensile after 100 hours at 500° F., psi | D-638 | 29,800 @ 4% |

EXAMPLE 2

Glass Content 40%

Equipment and monomer charge were identical to those shown in Example 1. When the Gardner viscosity had reached a Z3+ the solution was precipitated. After heating at 470° F. the solids content of the polymer was 98.3%. The 23.5 lbs of product was dry blended with 15.9 lbs of PPG 3531 glass fiber and 0.40 lbs of PTFE and pelletized. The product was then injection molded. Physical properties are shown in Table 3.

TABLE 3

| | | |
|---|---|---|
| Glass Content, % | | 40 |
| Injection Molding Temperature, °F. | | 600 |
| As Molded Properties | ASTM Method | |
| Tensile, psi | D-638 | 13,500 |
| Elongation, % | D-638 | 1.7 |
| Tensile Modulus, psi | D-638 | 1,068,000 |
| HDT, °F. | D-48 | 479 |
| Izod, ft-lbs/in. of notch | D-256 | 0.92 |
| Density g/cm$^3$ | D-1505 | 1.75 |
| Annealed Properties | ASTM Method | |
| Tensile, psi | D-638 | 33,600 |
| Elongation, % | D-638 | 4.2 |
| HDT, °F. | D-48 | 546 |
| Izod, ft-lbs/in. of notch | D-252 | 1.14 |
| Water absorption, % | D-570 | .26 |
| Tensile Modulus, psi | D-790 | 1,082,000 |
| Flex Modulus, psi | D-790 | 2,110,000 |
| Flex Strength, psi | D-790 | 54,200 |
| Density, g/cm$^3$ | D-1505 | 1.72 |
| Tensile Impact, ft-lbs | D-1822 | 34.3 |
| LOI | D-2863 | 50 |
| UL 94 | | VO |
| Tensile after 1000 hours, at 500° F., psi | | 29,480 @ 3.8% |
| Tensile Modulus after 1000 hours @ 500° F., psi | | 1,050,241 |
| Annealed Tensile at 300° F., psi | | 24,000 @ 8.3% |
| Annealed Tensile at 500° F., psi | | 19,800 @ 7.7% |
| Annealed Flex Mod at 500° F., psi | | 1,830,000 |
| Annealed Flex Strength at 500° F., psi | | 22,800 |

EXAMPLE 3

Glass Content 50%

The reactor, monomer charge and reaction conditions were the same as described in Examples 1 and 2. At a solution viscosity of Z2 the product was isolated by precipitation. Heat treatment of the product to 98% solids followed by compounding the 23.2 lbs with 23.7 lbs PPG 3531 and 0.47 lbs PTFE gave a good pelletized product. The physical properties of the injection molded product are revealed in Table 4.

TABLE 4

| | | |
|---|---|---|
| Glass Content, % | | 50 |
| Injection Molding Temperature, °F. | | 600 |
| As Molded Properties | ASTM Method | |
| Tensile, psi | D-638 | 11,900 |
| Elongation, % | D-638 | 1.7 |
| Tensile Modulus, psi | D-638 | 1,017,000 |
| HDT, °F. | D-638 | 466 |
| Izod, ft-lbs/in. of notch | D-48 | 0.79 |
| Flexural Modulus, psi | D-256 | 2,383,000 |
| Flexural Strength, psi | D-790 | 31,000 |
| Density g/cm$^3$ | D-790 | 1.70 |
| Annealed Properties | | |
| Tensile, psi | D-638 | 17,200 |
| Elongation, % | D-638 | 2.4 |
| HDT, °F. | D-48 | 525 |
| Izod, ft-lbs/in. of notch | D-256 | 1.05 |
| Flexural Modulus, psi | D-790 | 2,240,000 |
| Flexural Strength, psi | D-790 | 35,700 |
| Water absorption, % | D-570 | .16 |
| Density, g/cm$^3$ | D-1505 | 1.69 |
| Coef. of Lin. Them. Expan, (in./in/°F.) | D-696 | $0.78 \times 10^{-5}$ |
| LOI | D-2863 | 48 |
| UL 94 | | VO |
| Tensile after 100 hours, at 500° F., psi | | 28,900 @ 3.3% |
| Tensile after 1000 hours @ 500° F., psi | | 26,900 @ 3.1% |
| Tensile Modulus after 1000 hours, at 500° F., psi | | 1,038,900 |
| Annealed Tensile at 300° F., psi | | 9470 @ 1.8% |
| Annealed Tensile at 500° F., psi | | 12,000 @ 3.5% |
| Annealed Flex Mod at 500° F., psi | | 2,171,000 |
| Annealed Flex Strength at 500° F., psi | | 22,500 |

EXAMPLE 4

20% IPCl$_2$

A round-bottom, 2000-ml, 4-necked flask was charged with 1045 g dry N-methylpyrrolidone (NMP), 16.2 g (1.5 mol) m-phenylenediamine (MPDA), and 4.3 g trimellitic anhydride (TMA) (0.0225 mol). The flask was equipped with a mechanical stirrer, nitrogen inlet tube, thermometer, and a liquid addition funnel. During solution of the diamine and TMA, the addition funnel was charged with 248.0 g (1.178 mol) 4-trimellitoyl anhydride chloride (4-TMAC) and 60.9 g (0.30 mol) isophthaloyl dichloride (IPCl$_2$) and melted at 80° C. When melting was complete the solution of acid chlorides was added to the diamine/TMA solution over a 2-hour period at 25°-35° C. After addition was complete the viscous solution was heated to 50° C. and held for 1 hour. The product was split into 2 750-g portions. To one was added 135 g PPG 3531 ⅛" chopped glass fiber, and to the other was added 135 g 1.0" Fortafil-5 chopped graphite fiber. The blends were well mixed and each was precipitated into distilled water in a Waring blender using 10 sec contact time. The samples were filtered and washed 6 times with 1500 ml distilled water each wash. After drying on the funnel for 1-2 days each sample was heated for 2 hrs at 500° F., then compression molded at 330°-340° C.

| Properties: | | Method | | ASTM |
|---|---|---|---|---|
| 40% Glass | Tensile Strength | | 18,900 psi | D-638 |
| | Elongation | | 2.6% | D-638 |
| | Flex Modulus | | 1,703,000 psi | D-790 |
| | HDT | | >580° F. | D-48 |
| 40% Graphite | Tensile Strength | | 15,100 psi | D-638 |

| Properties: | | | ASTM Method |
|---|---|---|---|
| | Elongation | 1.6% | D-638 |
| | Flex Modulus | 2,690,000 psi | D-790 |
| | HDT | >580° F. | D-48 |

The reaction was repeated and worked up as the neat polymer. After a 2-hour cure at 470° F., a 75-g sample was compression molded at 330° C.

| Properties: | | ASTM Method |
|---|---|---|
| Tensile Strength | 23,800 psi | D-638 |
| Elongation | 8.3% | D-638 |
| Flex Modulus | 691,000 psi | D-790 |
| HDT | 546° F. | D-48 |

EXAMPLE 5

40% IPCl₂

The setup and procedure was identical to that described in Example 1. The charge was 207.3 g (1.02 mol) isophthaloyl dichloride (IPCl₂), 317.2 g (1.51 mol) 4-trimellitoyl anhydride chloride (4-TMAC), 4.9 g (0.0255 mol) trimellitic anhydride (TMA), 276.0 g (2.55 mol) m-phenylenediamine (MPDA), and 1826 g N-methylpyrrolidone (NMP). After the 1 hour at 50° C. heat treatment, two 825-g samples were removed from the flask and to one was added 148.5 g PPG 3531 chopped glass fiber, and to the other 148.5 g Fortafil-5 chopped graphite fiber. Workup was identical to Example 1. Both samples were compression molded at 340°–350° C.

| Properties: | | | ASTM Method |
|---|---|---|---|
| 40% Glass | Tensile Strength | 20,900 psi | D-638 |
| | Elongation | 6.1% | D-638 |
| | Flex Modulus | 1,670,000 psi | D-790 |
| | HDT | 557° F. | D-48 |
| 40% Graphite | Tensile Strength | 20,300 psi | D-638 |
| | Elongation | 2.8% | D-638 |
| | Flex Modulus | 2,783,000 psi | D-790 |
| | HDT | 573° F. | D-48 |

EXAMPLE 6

80% IPCl₂

The procedure followed for this experiment was identical to that used in Examples 1 and 2. The charge was 406.0 g (2.0 mol) isophthaloyl dichloride (IPCl₂), 100 g (0.475 mol) 4-trimellitic anhydride chloride (4-TMAC), 4.8 g (0.0250 mol) trimellitic anhydride (TMA), 270.3 g (2.50 mol) m-phenylenediamine (MPDA) and 1670 g N-methylpyrrolidone (NMP). Two 800-g solution samples were withdrawn and 144 g PPG 3531 and 144 g Fortafil-5 were added, respectively. Compression molded disks were formed for each at 315°–320° C.

| Properties: | | | ASTM Method |
|---|---|---|---|
| 40% Glass | Tensile Strength | 22,200 psi | D-638 |
| | Elongation | 6.6% | D-638 |
| | Flex Modulus | 1,530,000 psi | D-790 |
| | HDT | 542° F. | D-48 |
| 40% Graphite | Tensile Strength | 15,900 psi | D-638 |
| | Elongation | 2.0% | D-638 |
| | Flex Modulus | 2,290,000 psi | D-790 |
| | HDT | 526° F. | D-48 |

The remainder of the liquid solution was precipitated and the polymer worked up neat. After drying and post heating at 500° F. for 2 hours, a sample was molded at 310° C.

| Properties: | Neat | ASTM Method |
|---|---|---|
| Tensile Strength | 25,000 psi | D-638 |
| Elongation | 9.1% | D-638 |
| Flex Modulus | 723,000 psi | D-790 |
| HDT | 522° F. | D-48 |

All molded articles from the Examples 4 through 6 were given a 5-day annealing (heat treatment) cycle prior to testing. The schedule was: 1 day at 330° F., 1 day at 470° F., and 3 days at 500° F.

I claim:

1. A polyamide molding composition suitable for injection molding comprising recurring polyamide A units of

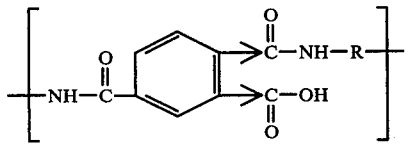

capable of undergoing imidization wherein→denotes isomerization and polyamide B units of

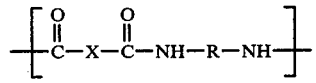

wherein the molar ratio of A units to B units is about 80 to 20 to 20 to 80 and the molding composition contains from about 30 to 50 weight percent of glass fibers, glass beads or a mixture thereof and R is a divalent aromatic hydrocarbon radical of from 6 to about 20 carbon atoms or 2 divalent hydrocarbon radicals of from about 6 to about 20 carbon atoms joined directly or by stable linkages selected from the group consisting of —O—, methylene, —CO—, —SO₂— and —S— radicals and X is a divalent aromatic radical.

2. The composition of claim 1 wherein the molding composition contains from about 30 to about 50 weight percent of glass fibers, glass beads or a mixture thereof.

3. The composition of claim 1 wherein R is

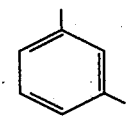

and X is

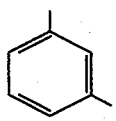

4. Shaped article comprising reinforced polyamide copolymer as claimed in claim 1.

5. Shaped article comprising reinforced polyamide copolymer as claimed in claim 2.

6. A polyamide-imide molding composition suitable for injection molding and forming shaped articles comprising recurring A' units of

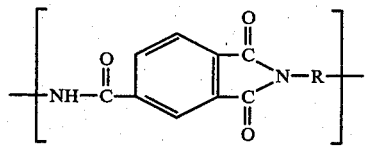

and polyamide B units of

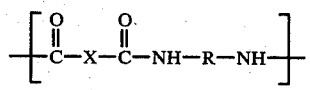

wherein the molar ratio of A' units to B units is about 80 to 20 to 20 to 80, and the molding composition contains from about 30 to 50 weight percent of glass fibers, glass beads or a mixture thereof and R is a divalent aromatic hydrocarbon radical of from 6 to about 20 carbon atoms or 2 divalent hydrocarbon radicals of from about 6 to 20 carbon atoms joined directly or by stable linkages selected from the group consisting of —O—, methylene, —CO—, —SO$_2$— and —S— radicals and X is a divalent aromatic radical.

7. The composition of claim 6 wherein the molding composition contains from about 30 to about 50 weight percent of glass fibers, glass beads or a mixture thereof.

8. The composition of claim 6 wherein R is

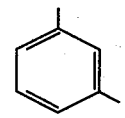

and X is

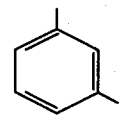

9. Shaped article comprising reinforced polyamide copolymer as claimed in claim 6.

* * * * *